(12) United States Patent
McKenney et al.

(10) Patent No.: US 7,353,346 B2
(45) Date of Patent: Apr. 1, 2008

(54) READ-COPY-UPDATE (RCU) OPERATIONS WITH REDUCED MEMORY BARRIER USAGE

(75) Inventors: Paul E. McKenney, Beaverton, OR (US); Suparna Bhattacharya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 11/388,364

(22) Filed: Mar. 24, 2006

(65) Prior Publication Data

US 2007/0226431 A1   Sep. 27, 2007

(51) Int. Cl.
*G06F 12/00* (2006.01)
(52) U.S. Cl. ...................... 711/154; 711/118
(58) Field of Classification Search ................ None
See application file for complete search history.

(56) References Cited

U.S. PATENT DOCUMENTS

| | | | |
|---|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,191,992 B1 | 2/2001 | Komoto |
| 6,219,690 B1 | 4/2001 | Slingwine et al. |
| 6,886,162 B1 | 4/2005 | McKenney |
| 6,996,812 B2 | 2/2006 | McKenney |
| 2002/0176369 A1 | 11/2002 | Porikli et al. |
| 2003/0014558 A1 | 1/2003 | Amamiya et al. |
| 2003/0108053 A1 | 6/2003 | Inaba |
| 2005/0050374 A1 | 3/2005 | Nakamura et al. |
| 2005/0149470 A1 | 7/2005 | Fujie |
| 2005/0149634 A1 | 7/2005 | McKenney |
| 2005/0198030 A1 | 9/2005 | McKenney |
| 2005/0223004 A1 | 10/2005 | McKenney et al. |
| 2006/0123100 A1* | 6/2006 | McKenney et al. .......... 709/223 |

OTHER PUBLICATIONS

U.S. Appl. No. 11/280,145, filed Nov. 14, 2005.
U.S. Appl. No. 11/264,580, filed Nov. 1, 2005.
U.S. Appl. No. 11/009,220, filed Dec. 9, 2004.
U.S. Appl. No. 10/995,657, filed Nov. 23, 2004.
U.S. Appl. No. 10/953,239, filed Sep. 29, 2004.
U.S. Appl. No. 10/974,514, filed Oct. 27, 2004.

(Continued)

*Primary Examiner*—Donald Sparks
*Assistant Examiner*—Horace L. Flournoy
(74) *Attorney, Agent, or Firm*—Abdy Raissinia

(57) ABSTRACT

Read-copy-update (RCU) is performed within real-time and other types of systems, such that memory barrier usage within RCU is reduced. A computerized system includes processors, memory, updaters, and readers. The updaters update contents of a section of the memory by using first and second sets of per-processor counters, first and second sets of per-processor need-memory-barrier bits, and a global flip-counter bit. The global flip-counter bit specifies which of the first or second set of the per-processor counters and the per-processor need-memory-barrier bits is a current set, and which is a last set. The readers read the contents of the section of the memory by using the first and second sets of per-processor counters, the first and second sets of per-processor need-memory-barrier bits, and the global flip-counter bit, in a way that significantly reduces the need for memory barriers during such read operations.

18 Claims, 11 Drawing Sheets

OTHER PUBLICATIONS

U.S. Appl. No. 11/129,803, filed May 16, 2005.
J. Seigh, "RCU+SMR for preemptive kernel/user threads," Linux kernel mailing list, http://lkml.org, May 9, 2005.
M. Michael, "Hazard pointers: Safe memory reclamation for lock-free objects," IEEE Trans. on Parallel & Distributed Sys., vol. 15, No. 6, Jun. 2004.
P. McKenney, "Towards hard realtime response from the Linux kernel: Adapting RCU to hard realtime," 2005 linux.conf.au presentation.
P. McKenney et al., "Towards hard realtime response from the Linux kernel on SMP hardware," 2005 linux.conf.au paper.
P. McKenney, "RCU and CONFIG_PREEMPT_RT progress," Linux kernel mail list, http://lkml.org, May 9, 2005.
D. Sarma et al., "Making RCU safe for deep sub-millisecond response realtime applications," 2004 USENIX (UseLinux), Jun. 2004.
P. McKenney, "RCU vs. locking performance of different types of CPUs," 2004 linux.conf.au presentation.
P. McKenney, "RCU vs. locking performance on different CPUs," 2004 linux.conf.au paper.
P. McKenney, "Scaling dcache with RCU," Linux Journal, Jan. 1, 2004.
P. McKenney, "Kernel Korner—Using RCU in the Linux 2.5 Kernel," Linux Journal, Oct. 10, 2003.
P. McKenney et al., "Read-copy update: An update," 2002 Ottawa Linux Symposium presentation.
H. Linder et al., "Scalability of the directory entry cache," 2002 Ottawa Linux Symposium paper.
P. McKenney et al., "Read-copy update," 2001 Ottawa Linux Symposium presentation.
P. McKenney et al., "Read-copy update: Using execution history to solve concurrency problems," Oct. 1998 PDCS.

* cited by examiner

FIG 1

| PROCESSOR | PER-PROCESSOR COUNTER | | PER-PROCESSOR NEED-MEMORY-BARRIER BIT | |
|---|---|---|---|---|
| | FIRST SET | SECOND SET | FIRST SET | SECOND SET |
| 102A | 104A | 106A | 108A | 110A |
| 102B | 104B | 106B | 108B | 110B |
| 102C | 104C | 106C | 108C | 110C |
| 102D | 104D | 106D | 108D | 110D |

COMPUTER-READABLE MEDIUM 100

GLOBAL FLIP-COUNTER BIT 112

LOCAL FLIP-COUNTER BIT 114

FLIP-COUNTER BIT LOCK 116

| TASK | PER-TASK READ-LOCK NESTING COUNTER | PER-TASK FLIP-COUNTER POINTER |
|---|---|---|
| 118A | 120A | 122A |
| 118B | 120B | 122B |
| 188C | 120C | 122C |
| ⋮ | | |
| 118N | 120N | 122N |

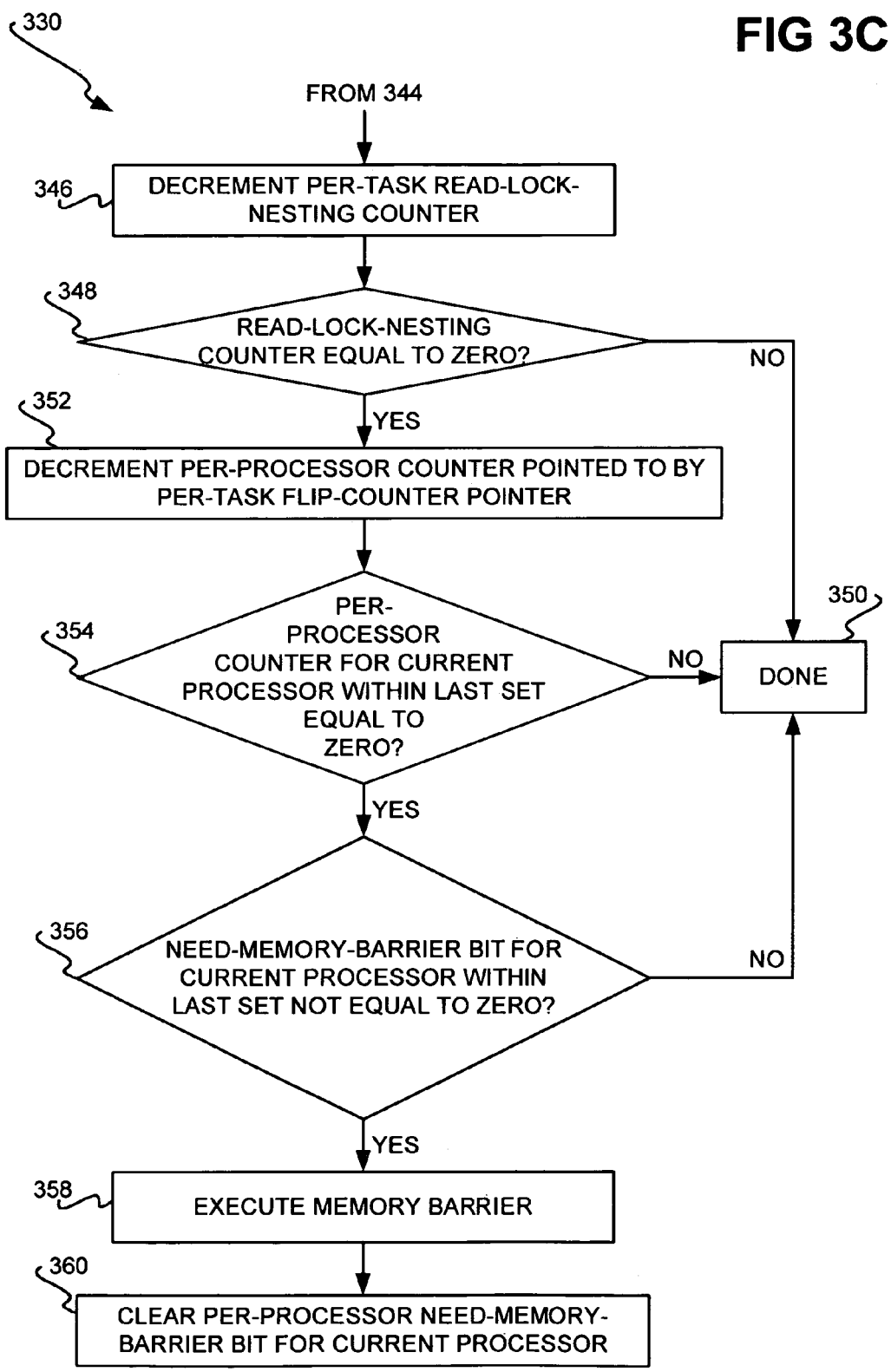

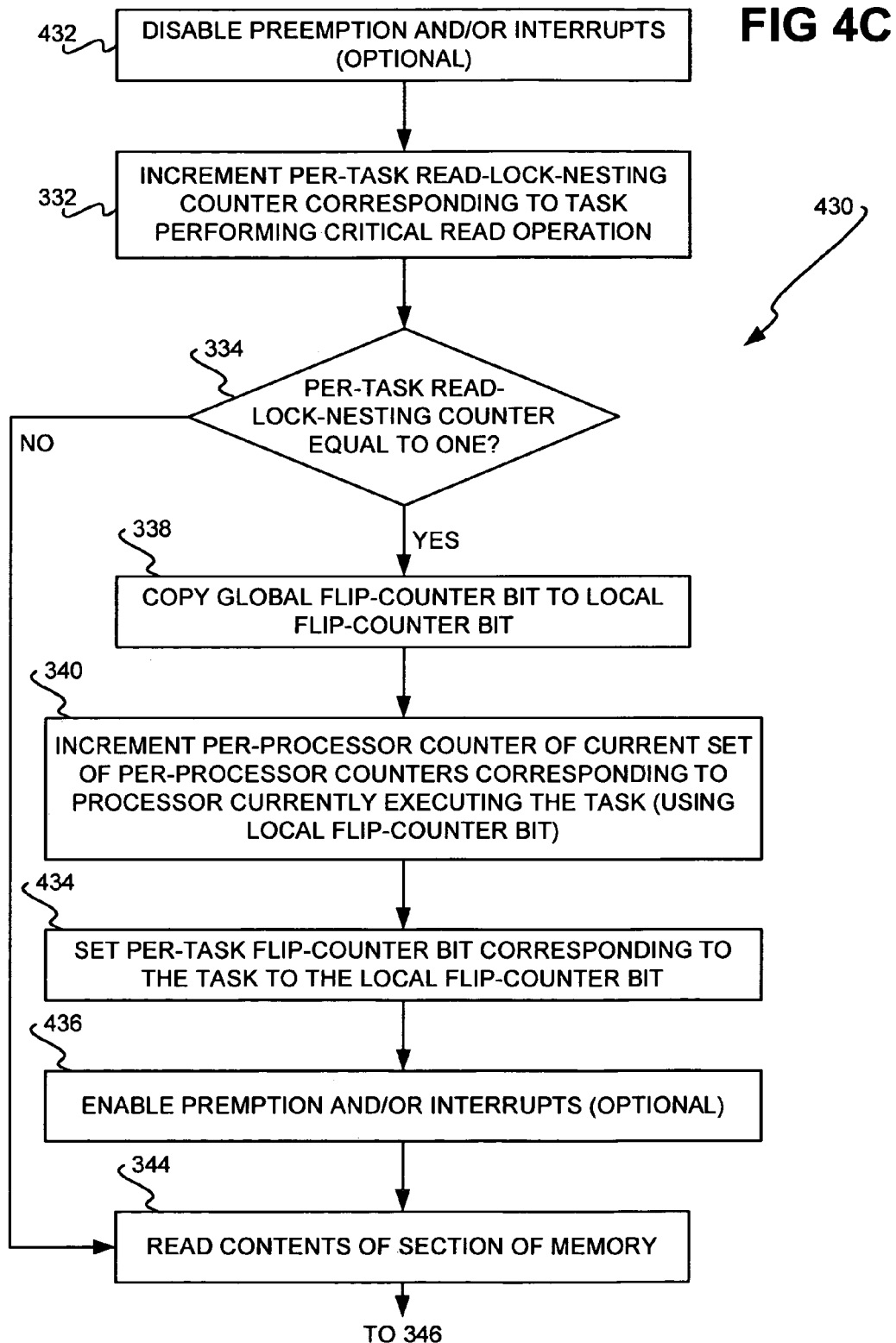

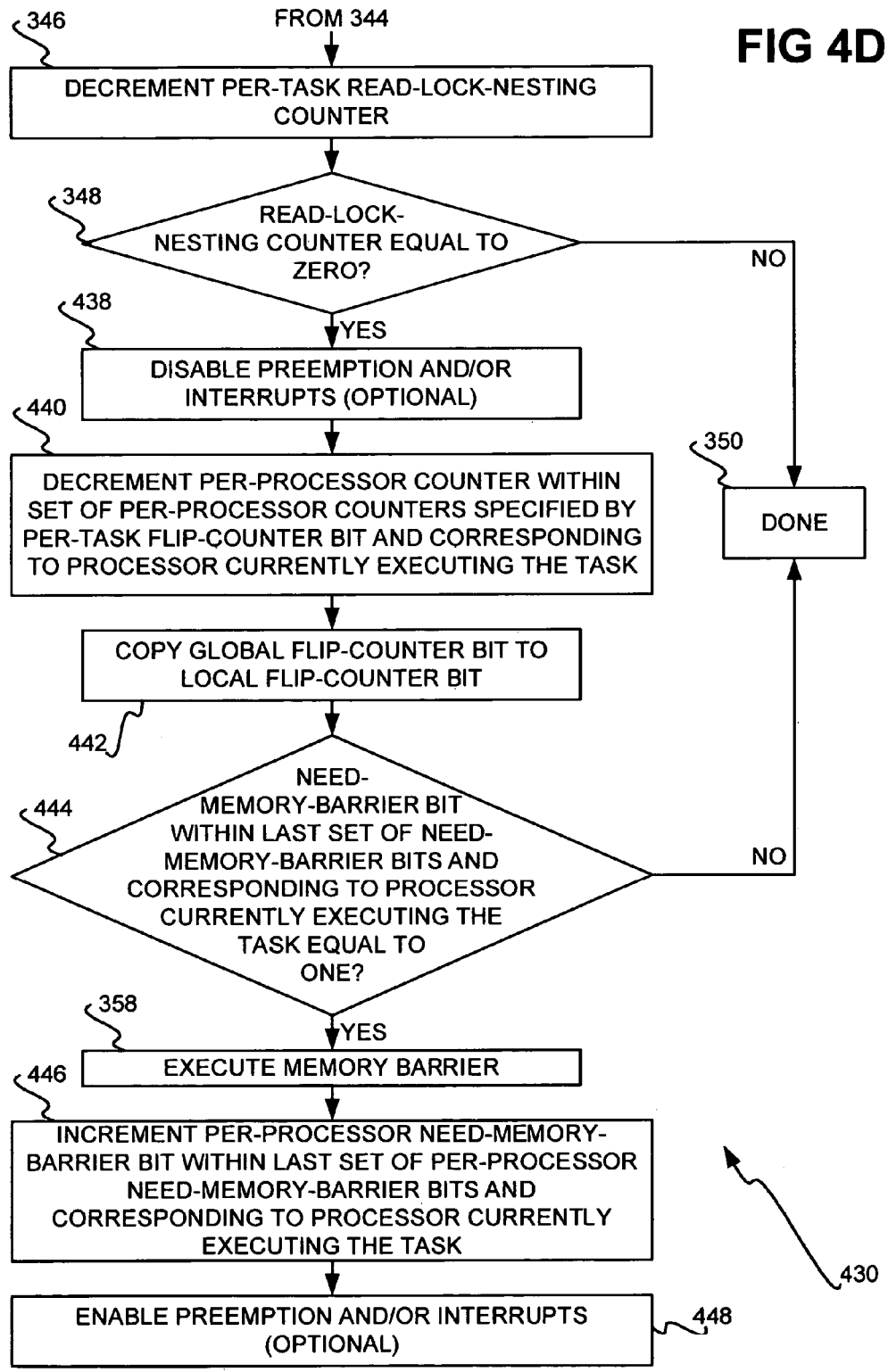

READ-COPY-UPDATE (RCU) OPERATIONS WITH REDUCED MEMORY BARRIER USAGE

FIELD OF THE INVENTION

The present invention relates to performing read-copy-update (RCU) operations in such a way that memory-barrier atomic-instruction usage is reduced, as is important, for instance, in real-time systems.

BACKGROUND OF THE INVENTION

Computerized systems are most generally used to maintain data. Data is created, modified, deleted, and read. In some types of systems, the worst-case time it takes to perform such operations is not important. That is, delays can be introduced when creating, modifying, deleting, and reading data, without affecting the needed average performance of the computerized system as a whole.

However, other types of systems, known as real-time systems, require that such worst-case delays be kept to a minimum, so that such systems essentially perform data-related operations in real-time, or in near-real-time. A real-time system may thus be considered a computer system that responds to operations by immediately updating the appropriate data and/or generating responses quickly enough to ensure that the system meets its response-time criteria. Therefore, delays that are introduced when creating, modifying, deleting, and reading data can hamper a system's ability to operate in real-time.

Some types of computerized systems use multiple processors. Such multiple-processor systems have to ensure serialized execution of critical sections of computer code that manipulate shared data structures. For example, if the data of a shared data structure is updated by one processor before it is read by another processor, it is important to ensure the order of these operations. That is, it is important to ensure that the data read by the latter processor is the updated version of the data as updated by the former processor. To ensure such serialized execution, various mechanisms for mutual exclusion can be employed. Mutual exclusion mechanisms ensure, for instance, that the data of a data structure is not read by one processor while another processor is currently updating that data.

Mechanisms for mutual exclusion that have been traditionally been used include spin locks, semaphores, reader-writer spin locks, and non-blocking synchronization, among other types of conventional such mechanisms. Even single-processor systems may require controlled concurrency when critical section code can be executed from both a process context as well an interrupt context. That is, during the updating of the data of a data structure by a process being executed by a processor, the processor may receive an interrupt which causes it to read that data. Therefore, it is important for the processor to recognize that the interrupt should not result in reading of the data until the process has finished updating the data.

For instance, for a spin lock, a process cannot update, or possibly cannot even read, a section of data until it acquires a lock on that data, such that it waits or "spins" until the lock can be acquired. While short-term mutual exclusions like spin locks are simple to use, with the advent of faster processors and memory interconnect speeds not keeping up with the speed of such processors, the cost of acquiring spin locks increases with each generation of computer architecture. The wider this gap is, the more cycles a processor has to wait for a slow memory interconnect to respond. Therefore, it has become increasingly necessary to look for alternatives to conventional spin-waiting locking models. This is especially true in the case of real-time systems.

Read-copy-update (RCU) is one such alternative mutual exclusion approach. In RCU, readers, which are threads or processes trying to access, but not modify, data, can access shared data without having to acquire any conventional type of lock. However, writers, which are threads or processes trying to update such data, have to use a special callback scheme to update the data. They update all the global references to the updated data with a new copy and use the callback scheme to free the old copy after all the processors have lost or released all local references to the data.

Because the write side of RCU is significantly more expensive in terms of execution time as compared to the read side, RCU is best suited for scenarios in which the data to be protected is read more often than it is written. For single-processor systems, RCU eliminates the need to mask interrupts for mutual exclusion purposes. RCU is thus suitable for mutual exclusion in network routing tables, device state tables, deferred deletion of data structures, and multiple-path input/output (I/O) device maintenance, among other applications.

However, the read side of such so-called "classic" RCU, while having nearly zero if not zero overhead to perform such a critical read operation, is nevertheless not well suited for usage in real-time systems. This is because classic RCU disables preemption during RCU read-side critical operations. Preemption allows a high-priority realtime task to interrupt, or preempt, the execution of a lower-priority non-realtime task, thereby permitting the realtime task to attain its response-time goal. Therefore, disabling preemption can degrade realtime response time or latency. While some real-time applications can tolerate such degraded latency, many more absolutely cannot.

Other types of RCU are adapted for usage in real-time systems, but require significant overhead in performing a critical read operation. For instance, readers of a data structure commonly employ memory barriers so that they do not have to acquire any type of conventional lock on the data structure. A memory barrier is an explicit instruction to a processor that causes the processor to order read and writes to memory. That is, a memory barrier is more precisely a memory barrier instruction that places constraints on the order of execution of other instructions, such as read and write instructions. As such, the processor cannot reorder read or write accesses (i.e., memory loads and stores) across the memory barrier.

For example, a section of code may include three read or write instructions, followed by a memory barrier instruction, followed by another three read or write instructions. A processor executing this section of code may reorder the execution of the first three read or write instructions relative to one another, and may reorder the execution of the last three read or write instructions relative to one another. However, because of the memory barrier instruction, the processor is not allowed to reorder the first three read or write instructions relative to the last three read or write instructions, and vice-versa.

Utilizing memory barriers adds significant overhead to such real-time read-side RCU. Such instructions are expensive in terms of added overhead, because they may be performed thousands of times slower than other operations. Furthermore, existing real-time RCU approaches may also employ atomic instructions, where atomicity means that a number of instructions are all performed, or none of them are. Atomic instructions are also expensive in terms of added overhead, and also may be performed thousands of times more slowly than other operations.

There is thus a need within the prior art for improved RCU performance within real-time systems, as well as within other types of systems. More specifically, memory barriers and atomic instructions should be used within the read side of RCU as sparingly as possible. For these and other reasons, therefore, there is a need for the present invention.

SUMMARY OF THE INVENTION

The present invention relates to read-copy-update (RCU) operations within real-time systems and other types of systems, and more particularly relates to reducing the usage of memory barriers within RCU. A method of one embodiment of the invention includes the following to perform an update operation on a section of memory to update the contents of that section of memory. A global flip-counter bit is copied to a local flip-counter bit. The global flip-counter bit specifies which of a first set of per-processor counters and a second set of per-processor counters is a current set of such per-processor counters and which is a last set of such per-processor counters. The global flip-counter bit also specifies which of a first set of per-processor need-memory-barrier bits and a second set of per-processor need-memory-barrier bits is a current set of such per-processor need-memory-barrier bits and which is a last set of such per-processor need-memory-barrier bits.

The method performs a number of steps or acts where the following four conditions are true. The first condition is that attempting to acquire a flip-counter-bit lock on the global-flip-counter bit is successful. The second condition is that the global flip-counter bit has not changed while acquiring the flip-counter-bit lock. The third condition is that all of the last set of per-processor counters are zero, such that none of the threads being executed by the processors corresponding to this last set of per-processor counters are currently executing a critical read operation on the section of memory. The fourth condition is that all of the last set of per-processor need-memory-barrier bits are zero, such that none of the processors needs to execute a memory barrier.

The steps or acts that are performed where these four conditions are true are as follows. First, each of the current set of per-processor need-memory-barrier bits is set to one, using the local flip-counter bit. The global flip-counter bit is then inverted. Finally, the flip-counter-bit lock that was acquired is released.

DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram showing the various data structures used to perform read-copy-update (RCU) while achieving reduced memory barrier usage, according to a preferred embodiment of the invention, and is suggested for printing on the first page of the patent.

FIGS. 3A, 3B, 3C, and 3D are flowcharts of methods for performing write-side and read-side RCU while achieving reduced memory barrier usage, as well as for expediting write-side RCU grace periods, according to varying embodiments of the invention.

FIGS. 4A, 4B, 4C, 4D, and 4E are flowcharts of methods for performing write-side and read-side RCU while achieving reduced memory barrier usage, as well as for expediting write-side RCU grace periods, according to different varying embodiments of the invention.

DETAILED DESCRIPTION OF THE DRAWINGS

Figure 2:
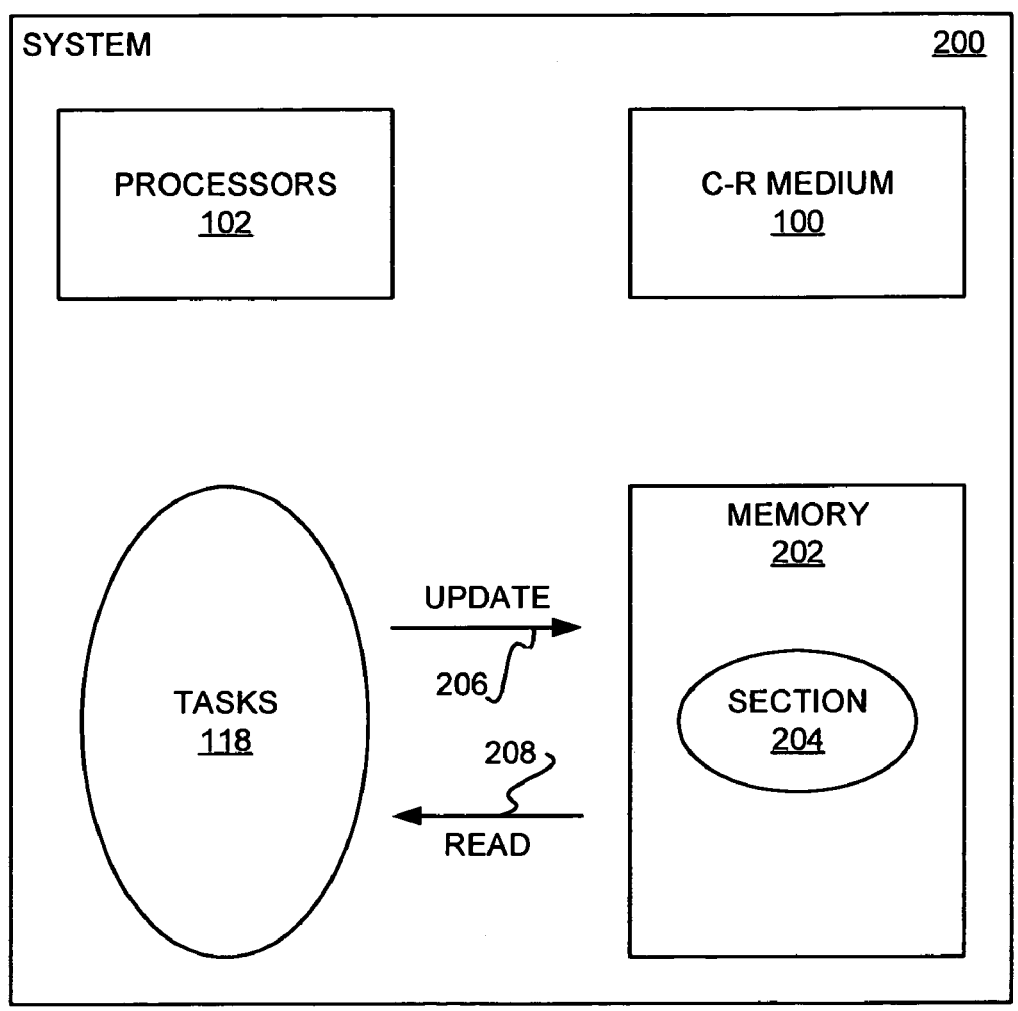
FIG. 2 is a diagram of a system, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview (Data Structures)

FIG. 1 shows a computer-readable medium 100 depicting the various data structures that are employed to achieve read-copy-update (RCU) while having reduced memory barrier usage, according to an embodiment of the invention. In this section of the detailed description, these data structures are described. In the subsequent sections of the detailed description, how these data structures are actually used to provide RCU while achieving reduced memory barrier usage is described. The computer-readable medium 100 may be a recordable data storage medium, like a semiconductor memory, such as a dynamic random-access memory (DRAM), a magnetic medium, or another type of tangible computer-readable medium. The methods that are described herein can be implemented as computer programs, or other types of means, stored on the medium.

The data structures stored on the computer-readable medium 100 are used in conjunction with a system. The system includes multiple processors, like four such processors 102A, 102B, 102C, and 102D, collectively referred to as the processors 102. In another embodiment, however, there may be fewer than four processors 102 or more than four processors 102.

Furthermore, the data structures stored on the computer-readable medium 100 are used in conjunction with such a multiple-processor system on which there are a number of tasks 118A, 118B, 118C, ..., 118N, collectively referred to as the tasks 118, running. Each of the tasks 118 is executed at any given moment in time by one of the processors 102. However, during the lifetime of a given task, the execution of the task may be switched among the processors 102. For instance, a task may first start execution on one processor, then switch execution to another processor, and so on. A task is a term used herein to signify a set of computer code executed by a processor. A task is thus used in a general and encompassing sense, and may include or also be referred to as a thread or a process. A given computer program may be made up of a number of such tasks that are executed serially and/or in parallel with one another.

The data structures stored on the computer-readable medium 100 may include two sets of per-processor counters: a first set of per-processor counters 104A, 104B, 104C, and 104D, collectively referred to as the first set of per-processor counters 104, and a second set of per-processor counters 106A, 106B, 106C, and 106D, collectively referred to as the second set of per-processor counters 106. The sets of per-processor counters 104 and 106 correspond to the processors 102 of the system. At any given time, one of the sets of per-processor counters 104 and 106 is a current set of per-processor counters. The other set of per-processor counters, which is not the current set of per-processor counters, is referred to as the last set of per-processor counters.

The per-processor counters 104 and 106 are used to track whether the processors 102 are currently engaged in a critical read operation, which may also be referred to as a critical read-side RCU operation. As will be described in detail in subsequent sections of the detailed description, when a processor first engages in such a critical read operation, it increments its corresponding counter within the current set of per-processor counters. As will also be described in detail in subsequent sections of the detailed description, when the critical read operation is completely finished, the corresponding counter is decremented.

A real-time read operation is a critical read operation where it has to be performed in order as compared to real-time write-side RCU operations and other real-time read-side RCU operations. For instance, within the prior art, such a critical real-time read operation may always employ a memory barrier. However, as will be described in detail in subsequent sections of the detailed description, such critical real-time read operations in accordance with embodiments of the invention employ memory barriers only sparingly.

The per-processor counters 104 and 106 can be represented in the C programming language in one embodiment as follows:

```
static DEFINE_PER_CPU(atomic_t [2], rcu_flipctr) =
    { ATOMIC_INIT(0), ATOMIC_INIT(0) };
```

The data structures stored on the computer-readable medium 100 also may include two sets of per-processor need-memory-barrier bits: a first set of per-processor need-memory-barrier bits 108A, 108B, 108C, and 108D, collectively referred to as the need-memory-barrier bits 108, and a second set of per-processor need-memory-barrier-bits 110A, 110B, 110C, and 110D, collectively referred to as the need-memory-barrier bits 110. The sets of per-processor need-memory-barrier bits 108 and 110 correspond to the processors 102 of the system. At any given time, one of the sets of need-memory-barrier bits 108 and 110 is a current set of need-memory-barrier bits. The other set of need-memory-barrier bits, which is not the current set of such bits, is referred to as the last set of need-memory-barrier bits.

The per-processor need-memory-barrier bits 108 and 110 are used to track whether, on a per-processor basis, a memory barrier is required. As will be described in detail in subsequent sections of the detailed description, at some point when any of a given set of need-memory-barrier bits is equal to one, a memory barrier is executed. Thus, the need-memory-barrier bits 108 and 110 are set by a processor when it needs to execute a memory barrier in relation to performing a given RCU operation.

The per-processor need-memory-barrier bits 108 and 110 can be represented in the C programming language in one embodiment as follows:

```
static DEFINE_PER_CPU(int [2], rcu_need_mb)={0,
    0};
```

The data structures stored on the computer-readable medium 100 also may include a global flip-counter bit 112 and a local flip-counter bit 114. The flip-counter bits 112 and 114 specify which of the sets of per-processor counters 104 and 106 is the current set of per-processor counters and which is the last set of per-processor counters. The flip-counter bits 112 and 114 also specify which of the sets of per-processor need-memory-barrier bits 108 and 110 is the current set of per-processor need-memory-barrier bits and which is the last set of per-processor need-memory-barrier bits.

For example, if the bits 112 and 114 are set equal to zero, then this can mean that the first set of per-processor counters 104 is the current set of per-processor counters, and the first set of need-memory-barrier bits 108 is the current set of need-memory-barrier bits. In such instance, the second set of per-processor counters 106 is the last set of per-processor counters, and the second set of need-memory-barrier bits 110 is the last set of need-memory-barrier bits. Likewise, if the bits 112 and 114 are set equal to one, then this can mean that the second set of counters 106 is the current set of counters, and the second set of need-memory-barrier bits 110 is the current set of such bits. In such instance, the first set of counters 104 is the last set of counters, and the first set of need-memory-barrier bits 110 is the last set of such bits.

The global flip-counter bit 112 is the primary bit that specifies which of the sets of counters 104 and 106 is the current set and which is the last set, and which of the sets of need-memory-barrier bits 108 and 110 is the current set and which is the last set. That is, the flip-counter bit 112 is global across all of the processors 102 of the system in question. By comparison, the local flip-counter bit 114 is used to copy the global flip-counter bit 112 when a given of the processors 102 is performing a read-side or a write-side RCU operation, and is applicable to just that processor, as is described in more detail later in the detailed description. There may be an instance of the local flip-counter bit 114 for each execution of a read operation or a write operation by a processor.

The flip-counter bits 112 and 114 can be represented in the C programming language in one embodiment as follows:

```
static int rcu_flipctrbit = 0;
static int local_rcu_flipctrbit = 0;
```

It is noted that the global rcu_flipctrbit is a global variable, whereas the local_rcu_flipctrbit is a local variable. This means that the rcu_flipctrbit is actually declared outside the scope of a function, whereas the local_rcu_flipctrbit is declared within each function in which it is used, as can be appreciated by those of ordinary skill within the art.

The data structures stored on the computer-readable medium 100 also may include a flip-counter-bit lock 116. The flip-counter-bit lock 116 is a lock for the global flip-counter bit 112. When a given task successfully acquires the flip-counter-bit lock 116, no other tasks are able to modify the global flip-counter bit 112 until the former task has released the lock 116. The flip-counter-bit lock 116 may be implemented as a conventional lock in one embodiment, as can be appreciated by those of ordinary skill within the art.

The flip-counter-bit lock 116 can be represented in the C programming language in one embodiment as follows:

```
DEFINE_SPINLOCK(rcu_fliplock);
```

The data structures stored on the computer-readable medium 100 may also include a set of per-task read-lock nesting counters 120A, 120B, 120C, . . . , 120N, collectively referred to as the per-task read-lock nesting counters 120. The read-lock nesting counters 120 correspond to the tasks 118 running on the processors 102 of the system. A given read-side RCU operation may include a nested group of RCU read-side critical operations. For example, a first critical read operation may include a nested second critical read operation, which may include a nested third critical read operation, and so on. The per-task read-lock nesting counters 120 thus track in which levels of nesting the corresponding tasks 118 currently are.

The incrementing of the per-processor counters 104 and 106 occurs just when the first, outer-most critical read operation is entered. Likewise, the decrementing of the per-processor counters 104 occurs just when the first, outer-most critical read operation is ultimately exited, after the exiting of the inner, nested critical read operations. This means that a memory barrier at most is executed just after exiting of the first, outer-most critical read operation, and not after exiting any of the inner, nested critical read operations. As a result, the frequency of memory barrier execution is decreased in this way.

When a critical read operation is entered by a given task, the per-task read-lock nesting counter corresponding to that task is incremented. Certain operations, such as incrementing of the per-processor counters 104 and 106, are performed only when, after incrementation of the appropriate per-task read-lock nesting counter, this nesting counter is equal to one, indicating that the first, outer-most critical read operation has been entered. Likewise, when a critical read operation is exited by a given task, the corresponding per-task read-lock nesting counter is decremented. Certain operations, such as performing a memory barrier, may be performed only when, after decrementation of the appropriate per-task read-lock nesting counter, this nesting counter is equal to zero, indicating that the first, outer-most critical read operation has been exited.

The per-task read-lock-nesting counters 120 can be represented in the C programming language in one embodiment as follows, by adding them to a particular data structure:

```
struct task_struct {
    ...
    int rcu_read_lock_nesting;
};
```

The data structures stored on the computer-readable medium 100 finally may include a set of per-task flip-counter pointers 122A, 122B, 122C, . . . , 122N, collectively referred to as the per-task flip-counter pointers 122. The flip-counter pointers 122 correspond to the tasks 118 running on the processors 102 of the system. As has been noted, a given task may begin execution on one of the processors 102, switch execution one or more times to other of the processors 102, and indeed finish execution on a completely different of the processors 102.

However, the per-processor counter of the sets of counters 104 and 106 that was initially incremented during a critical read operation by the task is the counter corresponding to the processor on which the task began execution. In order to track this counter, and thus the processor on which the task began execution, the per-task flip-counter pointer is set to point to the counter that was initially incremented. Therefore, even if the task changes processors, the correct counter will later be decremented when the critical read operation is completed. In other words, the set of per-task flip-counter pointers 122 allows the tasks 118 to keep track of which of the sets of counters 104 and 106 they originally incremented, and thus which of the processors 102 they were executing on when first executed.

The per-task flip-counter pointers 122 can be represented in the C programming language in one embodiment as follows, by adding them to a particular data structure:

```
struct task_struct {
    ...
    atomic_t *rcu_flipctrptr;
};
```

Technical Background (System)

FIG. 2 shows a system 200, according to an embodiment of the invention. The system 200 includes the multiple processors 102, the computer-readable medium 100 that stores the data structures of FIG. 1, the tasks 118, and a memory 202 accessible by the tasks 118. In one embodiment, the medium 100 and the memory 202 may be one in the same. The multiple processors 102 may be located on the same or different computing devices within the system 200, which are not specifically called out in FIG. 2. As can be appreciated by those of ordinary skill within the art, the system 200 may include other components, in addition to and/or in lieu of those depicted in FIG. 2.

The tasks 118 are able to access sections of the memory 202, such as the section 204 that is particularly depicted in FIG. 2, in at least two different ways. First, the tasks 118 may update the sections of the memory 202, as indicated by the arrow 206. Updating in this respect means changing the contents of a section of the memory 202, and can include deleting the contents as well. The section of the memory 202 in question may, for instance, have data stored therein in the form of a particular data structure. The updating process is particularly performed as a write-side read-copy-update (RCU) operation, as is described in more detail later in the detailed description. When a given of the tasks 118 is performing an update operation, it is referred to as an updating task, or an updater. Such updating utilizes at least some of the data structures that have been described in the previous section of the detailed description in relation to FIG. 1.

Second, the tasks 118 may read the sections of the memory 202, as indicated by the arrow 208. Reading in this respect means accessing the contents of a section of the memory 202, without actually changing the contents of the section of the memory 202. As before, the section of the memory 202 in question may, for instance, may have data stored therein in the form of a particular data structure. The reading process is particularly performed as a read-side read-copy-update (RCU) operation, as is described in more detail later in the detailed description. When a given of the tasks 118 is performing a read operation, it is referred to as a reading task, or a reader. Such reading utilizes at least some of the data structures that have been described in the previous section of the detailed description in relation to FIG. 1.

First Embodiment of RCU Operations

Figure 3A:
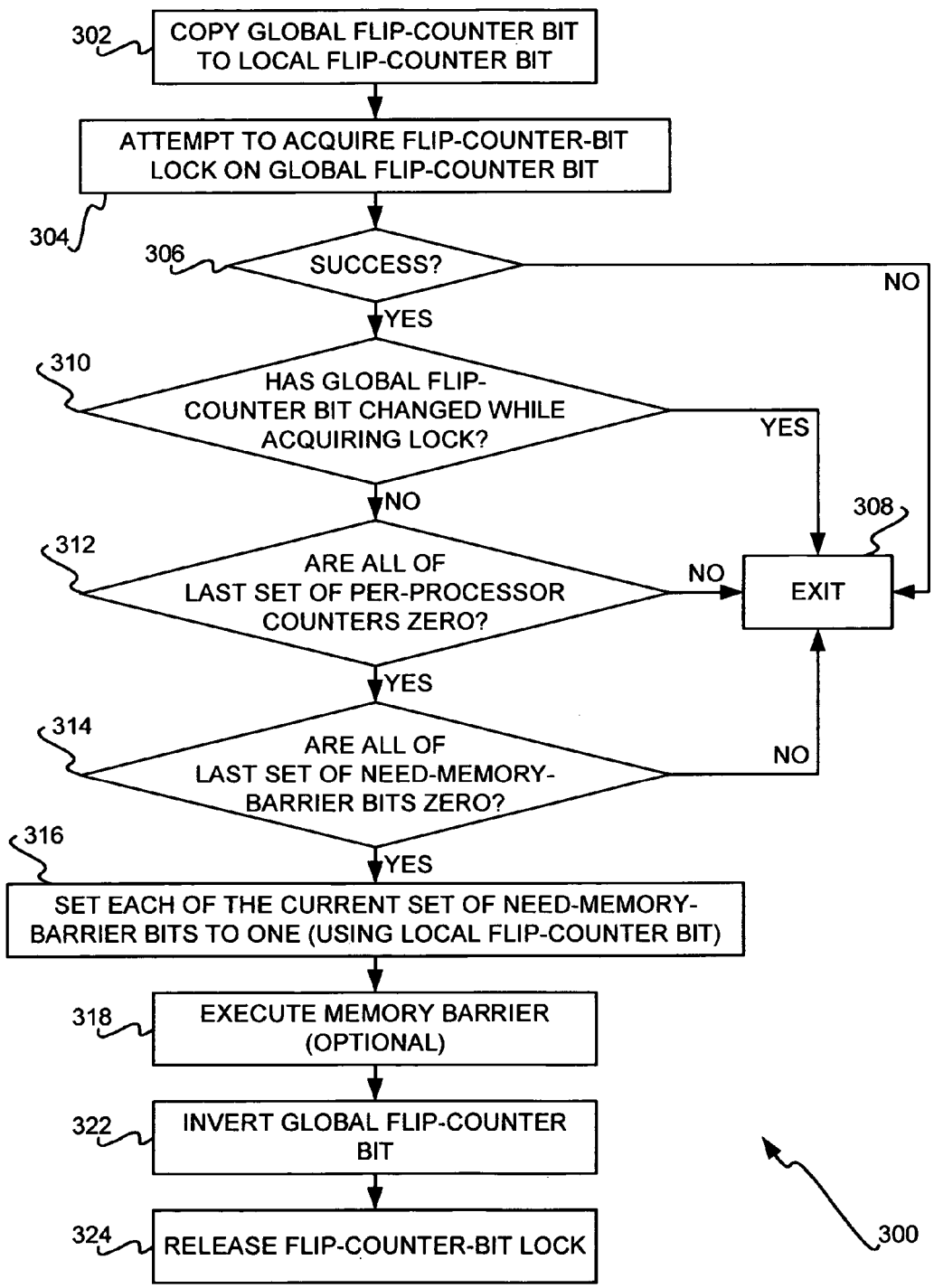

FIG. 3A shows a method 300 that is performed by a task to perform an update operation on a section of memory, to update the contents of the section of memory, according to an embodiment of the invention. That is, the method 300 is a write-side read-copy-update (RCU) operation. The method 300 employs the data structures that have been described in relation to FIG. 1, and can be performed in relation to the system 200 that has been described in relation to FIG. 2.

First, the global flip-counter bit is copied to a local flip-counter bit (302). The global flip-counter bit specifies which set of per-processor counters is the current set, and which set of per-processor counters is the last set. An attempt is made to acquire the flip-counter-bit lock on the global flip-counter bit (304). If the lock is not successfully acquired (306), then the updating task exits the method 300 (308). This is because another task has acquired the lock, and is performing an update operation, such that the updating task in relation to which the method 300 is being described must wait. Likewise, if the lock is successfully acquired (306), but the global flip-counter bit has changed while acquiring the lock (that is, the value of the global flip-counter bit is no longer equal to the local flip-counter bit) (310), then the updating task exits the method 300 (308).

Similarly, if the global flip-counter bit has not changed while acquiring the lock (310), but not all of the last set of per-processor counters are zero (312), then the updating task exits the method 300 (308). This is because if any of the per-processor counters is non-zero, then this means that that one or more tasks have not yet finished reading the section of memory in question, and therefore updating cannot be performed at this moment. Furthermore, if all of the last set of per-processor counters are zero (312), but not all of the last set of need-memory-barrier bits are zero (314), then the updating task exits the method 300 (308). This is because if any of the need-memory-barrier bits is zero, then this means that a memory barrier still needs to be executed in relation to a previously performed operation, such that updating has to wait until such a memory barrier is executed. In other words, the tests of parts 312 and 314 are performed to make sure that there is no previous activity as to the section of memory in question that needs to finish up, before the contents of this section of memory can be updated in accordance with the current performance of the method 300 by an updating task.

Thus, where all of the last set of need-memory-barrier bits are zero (314), then the updating task sets each of the current set of need-memory-barrier bits to one (316). This operation uses the local flip-counter bit, in the sense that this bit specifies which of the sets of need-memory-barrier bits is the current set, and which is the last set, as has been described. A memory barrier may be immediately executed in some embodiments at this time (318), especially where the system in relation to which the method 300 is being executed is a symmetric multiple-processor (SMP) system. This is because, in such systems, this memory barrier is needed so that the effects of part 316 are guaranteed to be seen by other processors before the effects of part 322 are.

The method 300 finishes by inverting the global flip-counter bit (322), and by releasing the flip-counter-bit lock (324). Inverting the global flip-counter bit switches the current and last sets of per-processor counters, as well as the current and last sets of per-processor need-memory-barrier bits. That is, the updating task is indicating that before any further updating needs to be done, a memory barrier needs to be executed, by virtue of all the then-current and now-last set of need-memory-barrier bits being set to one in part 316 of the method 300. The method 300 thus allows an effective write lock to be acquired, so that updating of the contents of the section of memory in question can be accomplished.

Figure 3B:
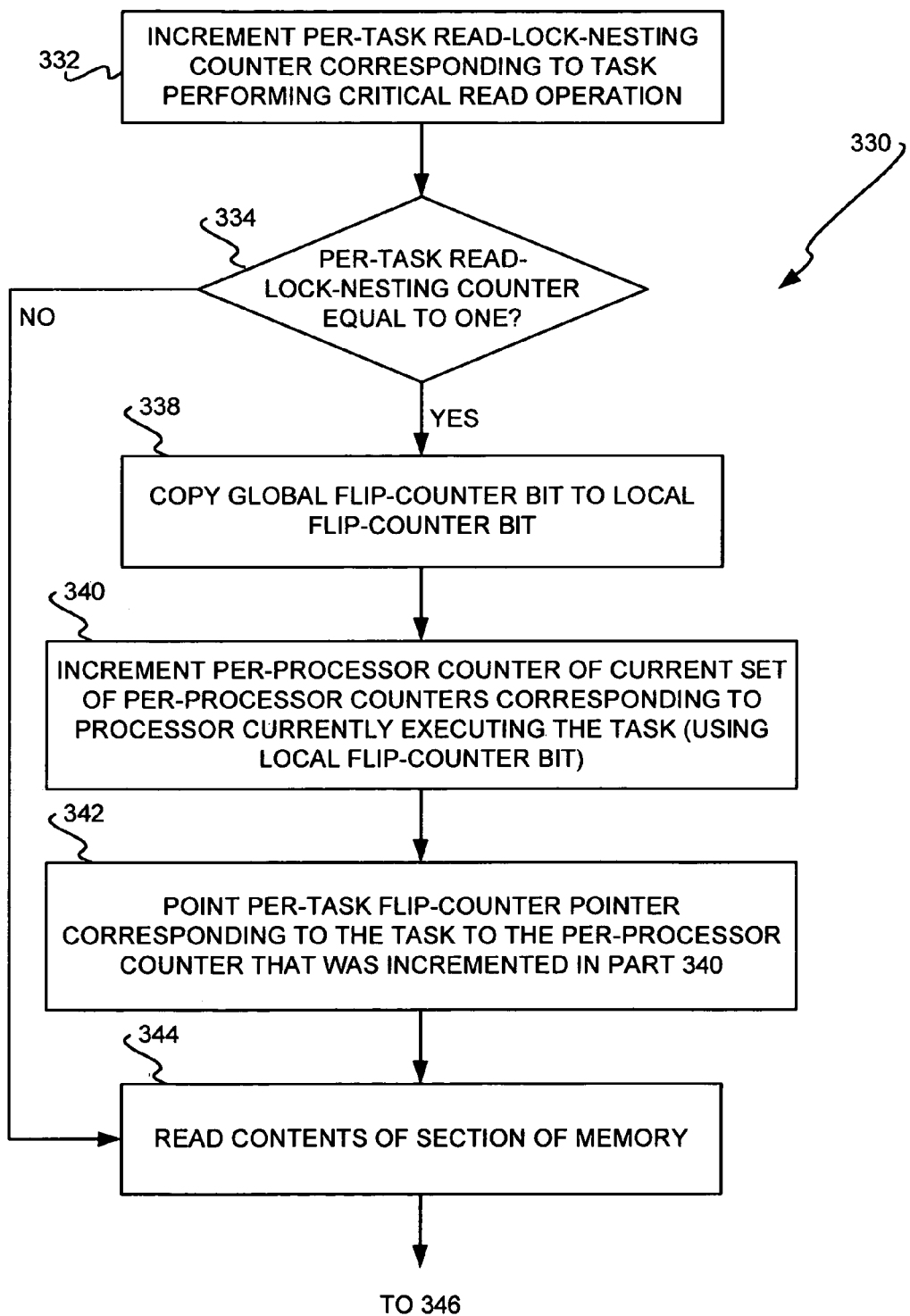

FIGS. 3B and 3C show a method 330 that is performed by a task to perform a read operation on a section of memory, to read the contents of the section of memory, according to an embodiment of the invention. That is, the method 330 is a critical read-side RCU operation. The method 330 employs the data structures that have been described in relation to FIG. 1, and can be performed in relation to the system 200 that has been described in relation to FIG. 2. The portion of the method 330 of FIG. 3B is specifically for acquiring the equivalent of a read lock on the section of memory, and for reading the contents of the section of memory. By comparison, the portion of the method 330 of FIG. 3C is specifically for releasing this effective read lock from the section of memory that the contents of which have been read.

First, the per-task read-lock nesting counter corresponding to the reading task performing the method 330 is incremented (332). That is, the reading task performing the present critical read operation has its corresponding per-task read-lock nesting counter incremented. If this read-lock-nesting counter is not equal to one (334), then the method 330 proceeds to part 344. This is because the current performance of the method 330 is not in relation to the first, outer-most critical read operation, but rather is in relation to an inner, nested critical read operation, and therefore the preparatory work that has to be performed with respect to the first, outer-most critical read operation does not need to be performed.

Thus, where the read-lock-nesting counter is equal to one (334), then the method 330 proceeds to part 338, since the current performance of the method 330 is in relation to the first, outer-most critical read operation, and the following preparatory work needs to be performed. Therefore, the global flip-counter bit is copied to the local flip-counter bit (338). Next, the per-processor counter of the current set of per-processor counters corresponding to the processor currently executing the reading task performing the method 330 is incremented (340). This operation uses the local flip-counter bit, in the sense that this bit specifies which of the sets of per-processor counters is the current set, and which is the last set, as has been described. This operation may also be considered as the equivalent of acquiring a read lock on the section of memory that is to be read, because the counter being non-zero specifies that a reading task—such as the task that is currently performing the method 330—is reading the contents of this section of memory.

Incrementation of the per-processor counter in part 340 may be performed atomically in one embodiment of the invention. In another embodiment of the invention, the per-processor counter is incremented atomically where the current value of the counter is greater than zero, and is incremented non-atomically where the current value of the counter is equal to zero.

The per-task flip-counter pointer corresponding to the reading task performing the method 330 is then set to point to the per-processor counter that was incremented in part 340 (342). As has been described above, the processor that executes the reading task may change. Therefore, part 342 is performed so that the per-processor counter that has been incremented in part 340 is properly decremented later, when releasing the effective read lock on the section of memory. From part 342 in the case of the first, outer-most critical read operation, or from part 334 in the case of an inner, nested critical read operation, the method 330 proceeds to read the contents of the section of memory (344), as desired.

Once the contents of the section of memory have been read, the effective read lock has to be released if the reading task currently performing the method 330 is performing the first, outer-most critical read operation, as opposed to an inner, nested critical read operation. Therefore, the per-task read-lock-nesting counter for this task is decremented (346). If after decrementation this read-lock-nesting counter is not zero (348), then this means the reading task currently performing the method 330 is an inner, nested critical read operation, such that the method 330 is done (350). That is, a memory barrier does not need to be executed, and so on. Thus, in such situations, embodiments of the invention avoid having to execute a memory barrier for critical read operations.

However, if after decrementation the read-lock-nesting counter for the task performing the method 330 is the first, outer-most critical read operation (348), then the per-processor counter pointed to by the per-task flip-counter pointer for this task is decremented (352), to essentially release a read lock that has been placed on the section of memory. As has been described, this per-task flip-counter pointer points to the per-processor counter that was previously incremented in part 340 of the method 330. Furthermore, if the per-processor counter for the current processor (i.e., for the processor that is currently executing the task) within the last set of per-processor counters is not equal to zero (354), such as being greater than zero, then this means that there are other effective read locks for the processor that corresponds to this counter, and the method 330 is done (350). That is, a memory barrier does not need to be executed, because the needed memory barrier will be executed after the per-processor counter is later decremented to zero. Thus, in these situations, too, embodiments of the invention avoid having to execute a memory barrier for critical read operations.

Decrementation of the per-processor counter in part 352 may be performed atomically in one embodiment of the invention. In another embodiment of the invention, the per-processor counter is decremented atomically where the current value of the counter is greater than one, and is decremented non-atomically where the current value of the counter is equal to one.

Next, if the per-processor counter for the current processor within the last set of per-processor counters is zero after decrementation (354), but if the need-memory-barrier bit for the current processor (i.e., the processor currently executing the task in question) within the last set of need-memory-barrier bits is not zero (356), then the method 330 is also done (350). This is because a memory barrier is only executed when one is needed. If the need-memory-barrier bit is equal to zero, then a memory barrier is not needed. Therefore, in these situations as well, embodiments of the invention avoid having to execute a memory barrier for critical read operations.

However, if the per-processor counter for the current processor within the last set of per-processor is zero after decrementation (354), and if the need-memory-barrier bit for the current processor within the last set of need-memory-barrier-bits is not zero (356), only then is a memory barrier executed (358). After such execution of a memory barrier, the per-processor need-memory-barrier bit for the current processor (i.e., the processor currently executing the task in question) is cleared if it has been set (360). This corresponding per-processor need-memory-barrier bit is within the last set of such need-memory-barrier bits.

It is noted that the method 330 of FIGS. 3B and 3C that has been described may require that interrupts be disabled and/or preemption be suppressed for the processor(s) that execute the reading task performing the method 330, while the method 330 is being performed. That is, because a true read lock is not acquired on the section of memory in question, the processor(s) may receive an interrupt that causes it update the section of memory, or another task or process may preempt the reading task on that processor and that causes it update the section of memory. In such instances, disabling interrupts and/or suppressing preemption may be desirable, if not necessary.

Figure 3D:
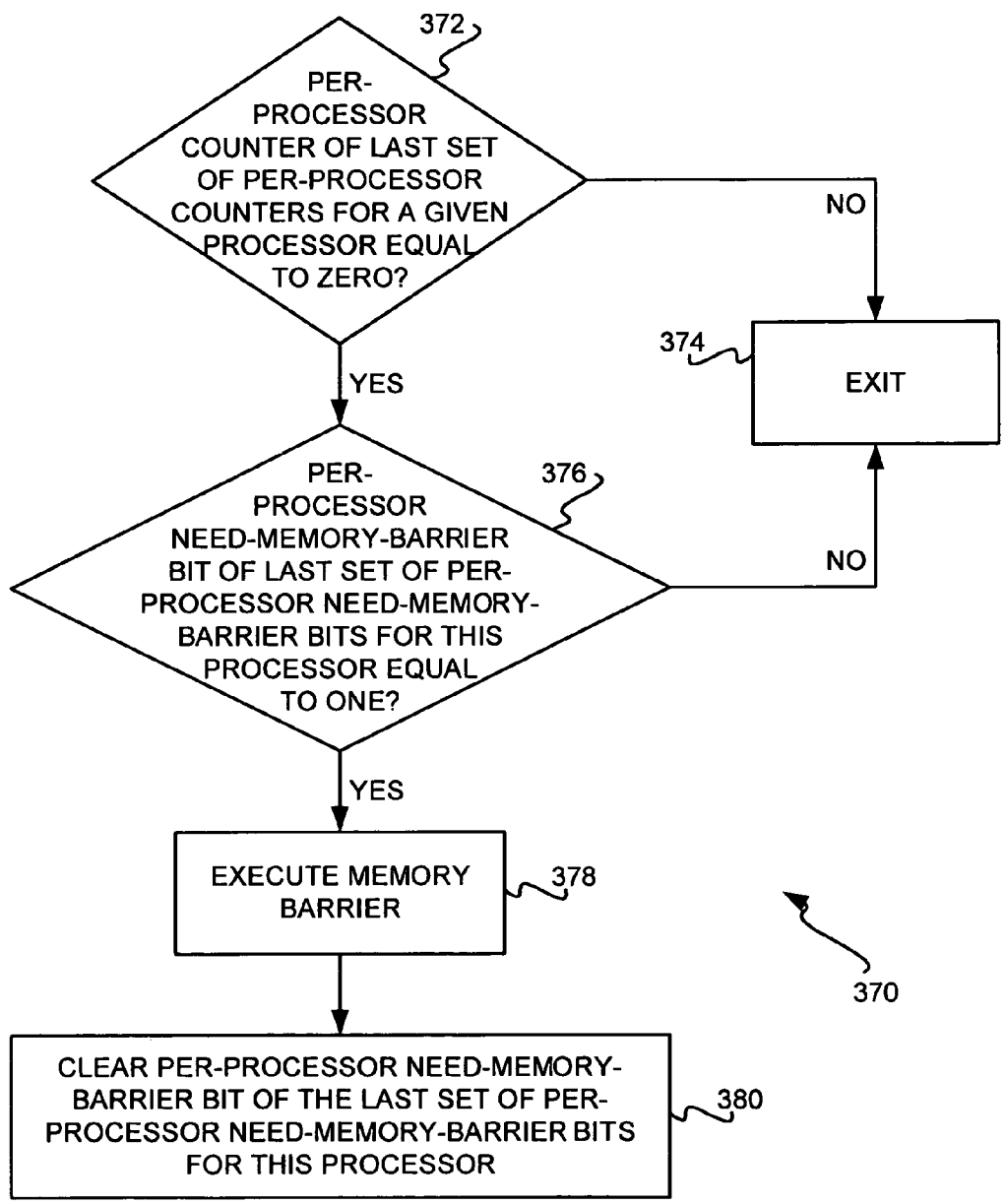

FIG. 3D shows a method 370 that may be performed at various times to increase performance of the RCU operations described in relation to FIGS. 3A, 3B, and 3C, according to an embodiment of the invention. However, the method 370 is not needed to implement the RCU operations described in relation to FIGS. 3A, 3B, and 3C. Rather, the method 370 may be called, as desired or on a periodic basis, so that any needed memory barriers are executed. For example, the method 370 may be performed during "down" or slow times of a given processor, when the processor may not, for instance, be actively executing any task. As another example, the method 370 may be performed as part of interrupt processing or when a given processor has been preempted by a preempting task, such that the method 370 is performed before beginning the processing of the interrupt or the preempting task in question.

As a third example, as can be appreciated by those of ordinary skill within the art, in implementations of write-side RCU operations that require callback processing, the method 370 can be performed as part of this callback processing, to accelerate what are known in the art as "grace periods." That is, a callback may be scheduled by an updating task prior to its exiting in part 308 and/or part 324 of the method 300 of FIG. 3A. When all the reading tasks in question have finished, the updating task is "called back" so that it can again attempt to perform the method 300 of FIG. 3A through completion. Furthermore, there may be a grace period that the updating task can wait such that after this period of time it is guaranteed that the updating task will be able to perform the method 300 of FIG. 3A through completion. However, the end of the grace period will be delayed until all the processors execute a memory barrier 358. If the updating task, then, does not want to be delayed awaiting a given processor's memory barrier, it may choose to perform the method 370 as to that processor.

When the method 370 is indeed executed by a given processor, if the per-processor counter of the last set of per-processor counters for this processor is not equal to zero (372), then the method 370 is exited (374). This is because a memory barrier is not useful where the processor in question had previously executed reading tasks that have not finished and released their effective read locks. Similarly, if this per-processor counter is equal to zero (372), but the per-processor need-memory-barrier bit of the last set of need-memory-barrier bits for this process is not equal to one (376), then the method 370 is also exited. In this case, the memory barrier has already been executed, and another barrier is unnecessary.

However, if this per-processor counter is equal to zero (372), and this per-processor need-memory-barrier bit is equal to one (376), then a memory barrier is executed (378). As a result, this per-processor need-memory-barrier bit can then be cleared (380). That is, because a memory barrier has been executed in part 378, the need-memory-barrier bit that was equal to one can be reset to zero in part 380, since such a memory barrier has indeed been executed.

Second Embodiment of RCU Operations and Conclusion

In the previous embodiment of read-copy-update (RCU) operations described in the previous section of the detailed description, each per-processor need-memory-barrier bit has one of two values. Each need-memory-barrier bit can have a first value, such as zero, indicating that a memory barrier is not needed by the processor corresponding to this bit.

Each need-memory-barrier bit can also have a second value, such as one, indicating that a memory barrier is needed by the processor corresponding to this bit. Furthermore, in the previous embodiment described in the previous section of the detailed description, each per-task flip-counter pointer points to the per-processor counter that was incremented for a given processor, so that the same counter is then later decremented, even if the task in question changes processors during execution.

By comparison, in the embodiment of RCU operations described in the present section of the detailed description, each per-processor need-memory-barrier bit is capable of having one of three values. Each need-memory-barrier bit may have a first value, such as zero, indicating that the processor corresponding to this bit is not yet ready for a memory barrier. Each need-memory-barrier bit can also have a second value, such as one, indicated that a memory barrier is needed by the processor corresponding to this bit. Each need-memory-barrier bit may further have a third value, such as two, indicating that a memory barrier has been supplied, provided, or executed. It is noted that the terminology need-memory-barrier "bit" as used in relation to this embodiment of the invention is taken in a general and encompassing sense, such that the bit may indeed take on one of more than two different values. That is, the claimed invention is to be interpreted such that a "bit" is more generally a variable, for instance, that may take on at any given time one of more than two different values.

Furthermore, in the embodiment described in the present section of the detailed description, each per-task flip-counter pointer does not point to the per-processor counter that was incremented for a given processor, but rather records and preserves the value of the global flip-counter bit when the first, outer-most critical read operation is entered. That is, rather than pointing to a given per-processor counter of the counters 104 and 106 of FIG. 1, for instance, a per-task flip-counter pointer instead "points" to which set of the counters 104 and 106 is the current set when the first, outer-most critical read operation is entered. As such, the terminology per-task flip-counter "pointer" is subsequently referred to in this section of the detailed description as a per-task flip-counter "bit" since it records or preserves the value of another bit, the global flip-counter bit. However, the claimed invention is to be interpreted such that a per-task flip-counter "pointer" may take on the value of the global flip-counter bit, such that a per-task flip-counter "pointer" encompasses a per-task flip-counter "bit" as well.

Figure 4A:
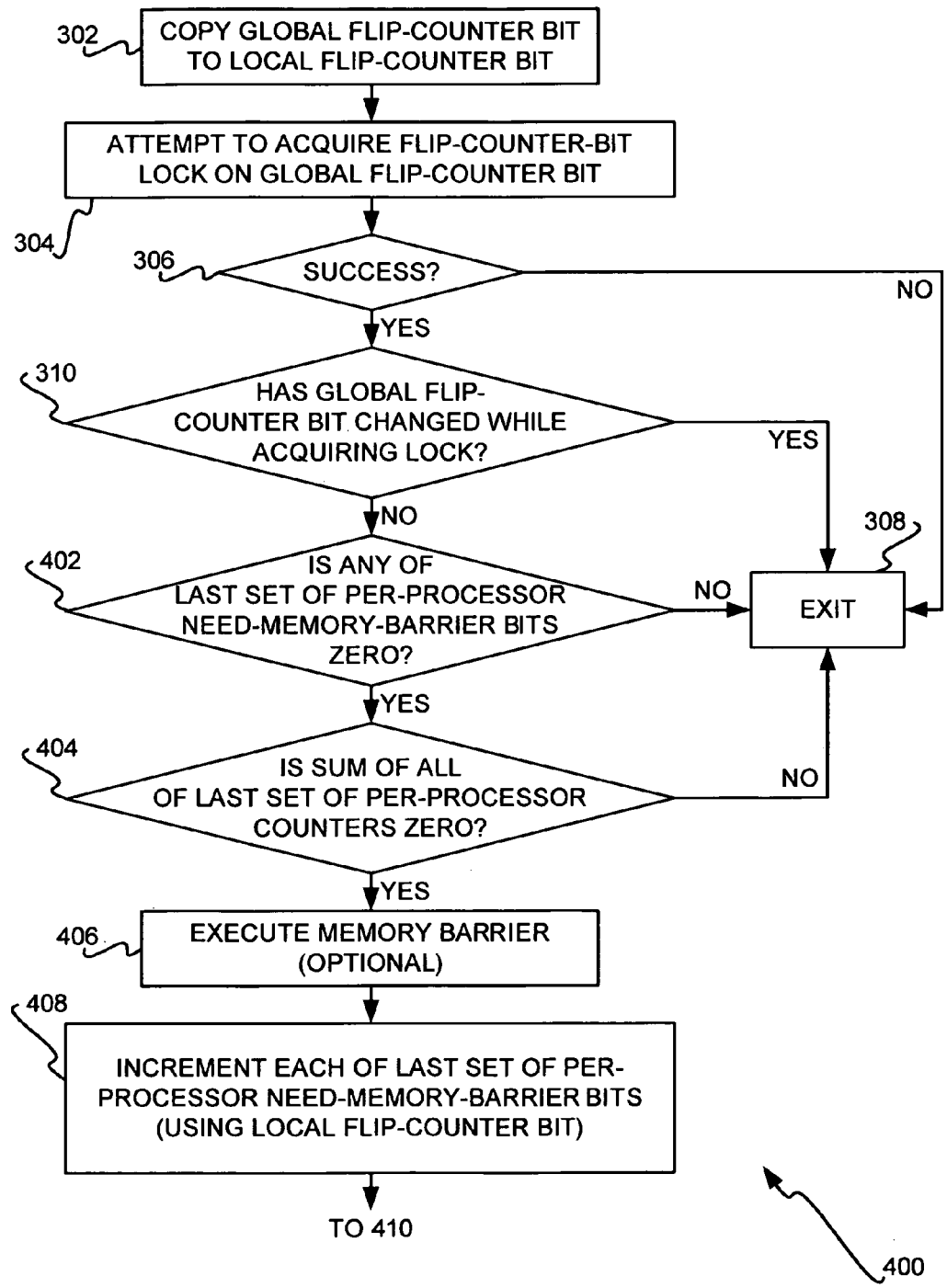
Figure 4B:
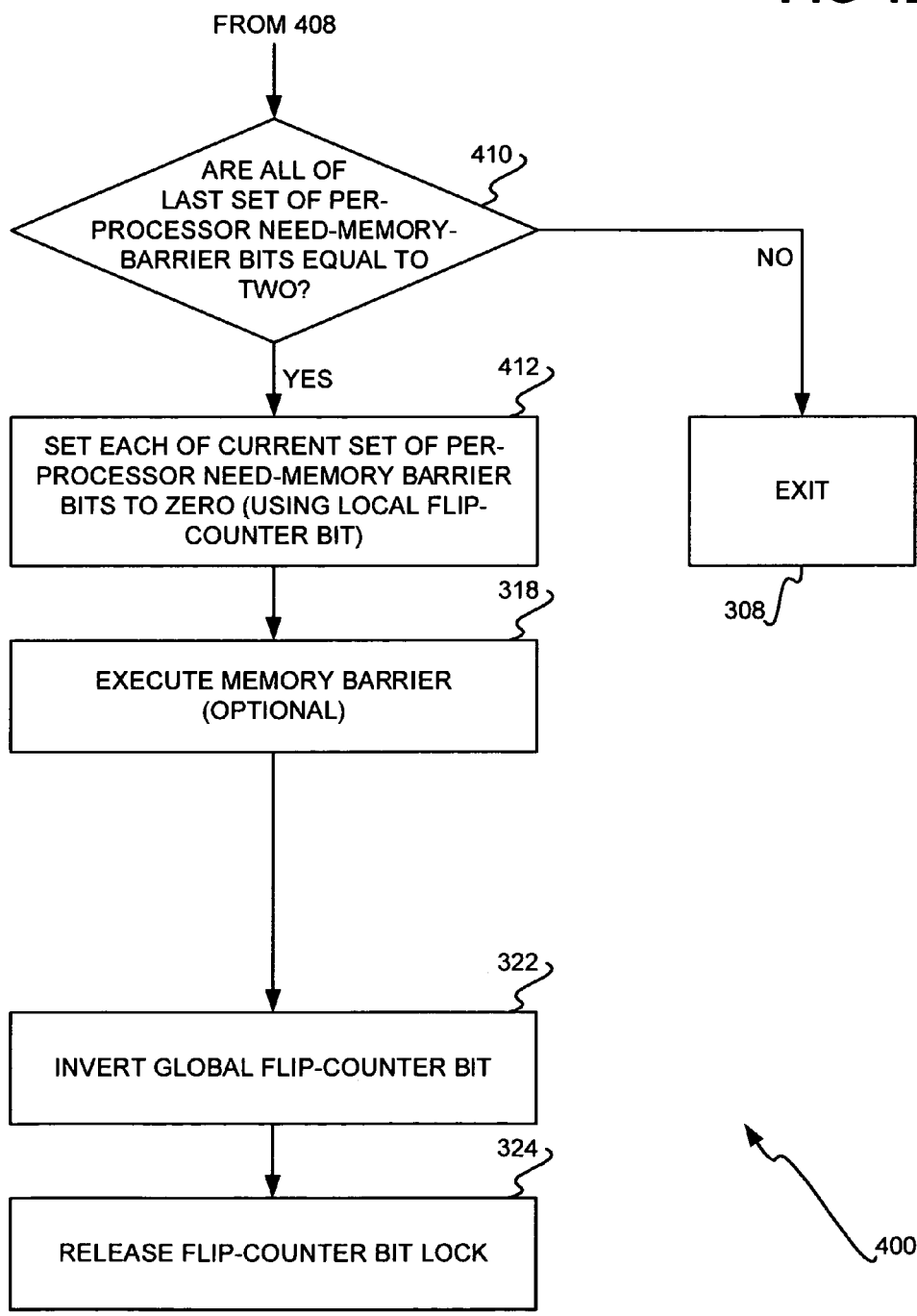

FIGS. 4A and 4B show a method 400 that is performed by a task to perform an update operation on a section of memory, to update the contents of the section of memory, according to an embodiment of the invention. That is, the method 400 is a write-side read-copy-update (RCU) operation. The method 400 employs the data structures that have been described in relation to FIG. 1, as modified as has been described above, and can be performed in relation to the system that has been described in relation to FIG. 2. Like numbered-parts between FIGS. 4A and 4B and FIG. 3A are performed the same as have been described in relation to FIG. 3A.

The global flip-counter bit is copied to a local flip-counter bit (302). An attempt is made to acquire the flip-counter-bit lock on the global flip-counter bit (304). If the lock is not successfully acquired (306), then the updating task exits the method 400 (308), as in the method 300. Likewise, if the lock is successfully acquired (306), but the global flip-counter bit has changed while acquiring the lock (310), then the updating task exits the method 400 (308). Similarly, if the global flip-counter bit has not changed while acquiring the lock (310), but if any of the last set of per-processor need-memory-barrier bits is not equal to zero (402), then the updating task exits the method 400 (308). This is because if any of the need-memory-barrier bits is greater than zero, then one or more of the processors needs to execute a memory barrier, which has to be executed before any further updating can be performed, such that updating cannot be performed at this moment.

Furthermore, if any of the last set of per-processor need-memory-barrier bits is equal to zero (402), but the sum of all of the last set of per-processor counters is not equal to zero (404), then the updating task exits the method 400 (308). It is noted that the test of part 402 is whether any of the last set of per-processor need-memory-barrier bits is zero, because, as will become apparent later in this section of the detailed description, if one of the need-memory-barrier bits is zero, then all of them will be zero. That is, the need-memory-barrier bits are zero in unison with one another. Thus, in another embodiment, the need-memory-barrier bits may be represented by a single bit, or state variable, for the test of part 402, such that the claimed invention's utilization of a set of per-processor need-memory-barrier bits in part 402 is to be interpreted as encompassing the use of such a single bit or state variable.

It is noted that the sum of all of the last set of per-processor counters not being equal to zero in part 404 means that one or more tasks have not yet finished reading the section of memory in question, such that updating cannot be performed at this moment. It is also noted that the test of part 404 as to whether the sum of all of the last set of per-processor counters is not equal to zero may not be satisfied merely if any of the last set of per-processor counters is not equal to zero, since the per-processor counters can be negative (in the event a reader gets preempted and migrates/gets scheduled to a different processor, and in such instance the sum could still be zero.

Where the sum of all of the last set of per-processor counters is equal to zero (404), then in one embodiment a memory barrier is immediately executed, especially where the system in relation to which the method 400 is being executed is a symmetric multiple-processor (SMP) system. This is because, in such systems, this memory barrier is needed so that the effects of part 302 are guaranteed to be in order in relation to the effects of part 408. Thereafter, each of the last set of per-processor need-memory-barrier bits is incremented (408). This operation uses the local flip-counter bit, in the sense that this bit specifies which of the sets of need-memory-barrier bits is the current set, and which is the last set, as has been described.

If all of the last set of per-processor need-memory-barrier bits are not now equal to two (410), then the updating task exits the method 400 (308). However, if all of the last set of per-processor need-memory-barrier bits are now equal to two (410), after incrementation, then each of the current set of per-processor need-memory bits is set to zero (412), again using the local flip-counter bit. Thus, the updating task indicates that none of the processors is currently ready for execution of a memory barrier. Thereafter, in one embodiment, a memory barrier is executed (318), especially where the system in relation to which the method 400 is being executed is an SMP system, as before.

The method 400 finishes by inverting the global flip-counter bit (322), and by releasing the flip-counter-bit lock (324). Inverting the global flip-counter bit switches the current and last sets of per-processor counters, as well as the current and last sets of per-processor need-memory-barrier bits. The method 400 thus acquires an effective write lock on the section of memory in question, so that any memory removed from data structures prior to the previous flip may now be destructively updated (e.g., such as by having the memory freed for allocation for other purposes).

FIGS. 4C and 4D show a method 430 that is performed by a task to perform a read operation on a section of memory, to read the contents of the section of memory, according to an embodiment of the invention. That is, the method 430 is a critical read-side RCU operation. The method 430 employs the data structures that have been described in relation to FIG. 1, as modified as has been described above, and can be performed in relation to the system that has been described in relation to FIG. 2. Like-numbered parts between FIGS. 4C and 4D and FIGS. 3B and 3C are performed the same as have been described in relation to FIGS. 3B and 3C. The portion of the method 430 of FIG. 4C is specifically for acquiring the equivalent of a read lock on the section of memory, and for reading the contents of the section of memory. By comparison, the portion of the method 430 of FIG. 4D is specifically for releasing this effective read lock from the section of memory that the contents of which have been read.

First, preemption and/or interrupts as to the processor executing the reading task performing the method 430 may be disabled (432). Preemption and/or interrupts may be disabled so that a preempting task, or an interrupt, does not acquire or modify the effective read lock that is acquired by the reading task performing the part of the method 430 in FIG. 4C. Next, the per-task read-lock nesting counter corresponding to the reading task performing the method 430 is incremented (332). If this read-lock-nesting counter is not equal to one (334), then the method 430 proceeds to part 344, as before.

Thus, where the read-lock-nesting counter is equal to one (334), then the method 430 proceeds to part 338, and the global flip-counter bit is copied to the local flip-counter bit (338). The per-processor counter of the current set of per-processor counters corresponding to the processor currently executing the reading task performing the method 430 is incremented (340). As before, this operation uses the local flip-counter bit, and may be considered the equivalent of acquiring a read lock—i.e., an effective read lock—on the section of memory that is to be read.

The per-task flip-counter bit corresponding to the reading task performing the method 430 is then set equal to the local flip-counter bit (434). This operation records and preserves which of the two sets of per-processor counters is the current set and which is the last set at this time, and which of the two sets of need-memory-barrier bits is the current set and which is the last set at this time. If preemption and/or interrupts have been previously disabled in part 432, they are now enabled (436), because the effective read lock on the section of memory that the contents of which are to be read has been acquired. The method 430 proceeds to read the contents of this section of memory (344), as desired.

The per-task read-lock-nesting counter for the reading task performing the method 430 is then decremented (346). If after decrementation this read-lock-nesting counter is not zero (348), then the method 430 is done (350). However, if after decrementation the read-lock-nesting counter for the task performing the method 430 is zero, then preemption and/or interrupts may again be optionally disabled (438). Preemption and/or interrupts may be disabled so that a preempting task, or an interrupt, does not modify the effective read lock that is released by the reading task performing the part of the method 430 in FIG. 4D.

The per-processor counter within the set of per-processor counters specified by the per-task flip-counter bit, and which corresponds to the processor currently executing the reading task performing the method 430, is then decremented (440). That is, the per-task flip-counter bit specifies one of the two sets of per-processor counters. Within this specified set of counters, the counter that corresponds to the processor currently executing the task performing the method 430 is decremented. The global flip-counter bit is then copied to the local flip-counter bit again (442).

Next, if the need-memory-barrier bit within the last set of need-memory-barrier bits, and which corresponds to the processor currently executing the reading task performing the method 430, is not equal to one (444), then the method 430 is finished (350). The need-memory-barrier bit corresponding to the processor currently executing the task performing the method 430 not being equal to one means that a memory barrier does not have to be executed at this time. This is because a memory barrier is only executed when the need-memory-barrier bit is equal to one in this embodiment.

Thus, if the need-memory-barrier bit within the last set of such bits, and that corresponds to the processor currently executing the task performing the method 430, is equal to one (444), only then is a memory barrier executed (358). After such execution of a memory barrier, this per-processor need-memory-barrier bit is then incremented (446), to indicated that a memory barrier has been appropriately supplied or provided. If preemption and/or interrupts have been previously disabled in part 438, they are now enabled (448), because the effective read lock on the section of memory that the contents of which are to be read has been released.

Figure 4E:
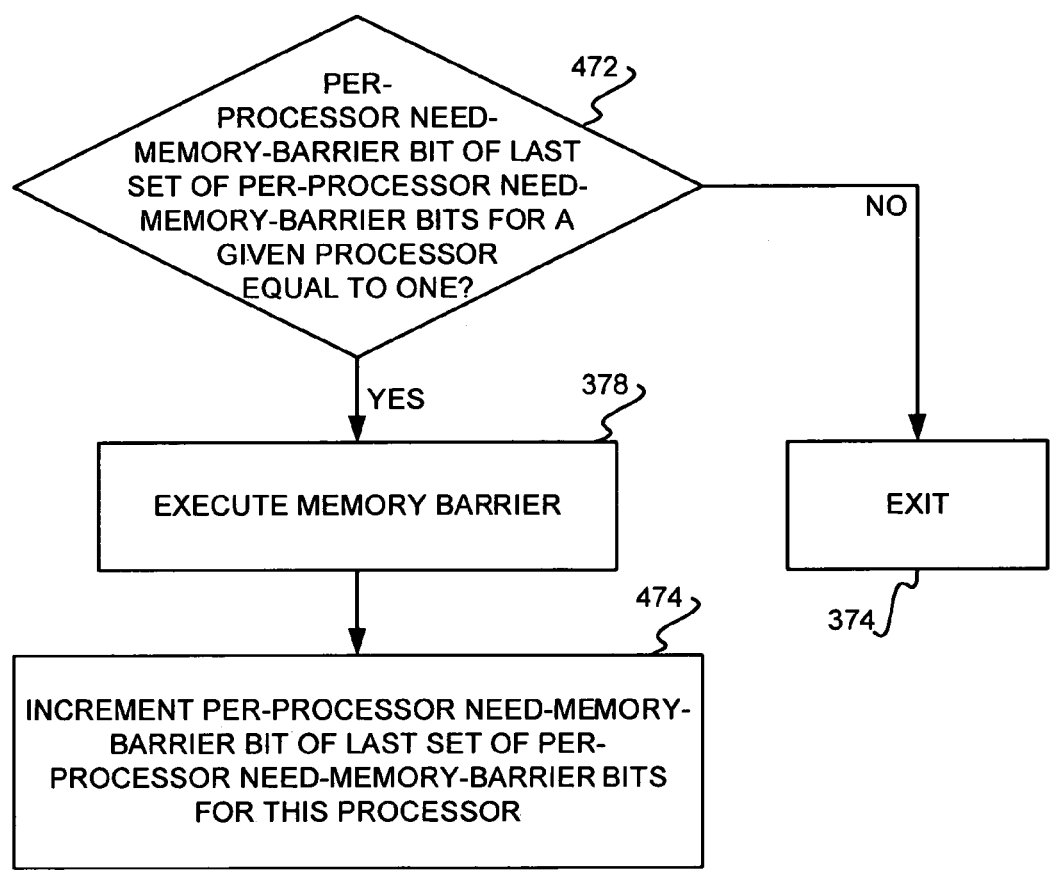

FIG. 4E shows a method 470 that may be performed at various times to increase performance of the RCU operations described in relation to FIGS. 4A, 4B, 4C, and 4D, according to an embodiment of the invention. However, the method 470 is not needed to implement the RCU operations described in relation to FIGS. 4A, 4B, 4C, and 4D. Rather, the method 470 may be called, as desired or on a periodic basis, so that any needed memory barriers are executed, as has been described, for instance, in relation to the method 370 of FIG. 3D. Like-numbered parts between FIG. 4E and FIG. 3D are performed the same as have been described in relation to FIG. 3D.

Therefore, when the method 470 is executed by a given processor, if the per-processor need-memory-barrier bit of the last set of such need-memory-barrier bits for this processor is not equal to one (472), then the method 470 is exited (374). This is because a memory barrier does not need to be executed, such that one should not be executed. However, if the need-memory-barrier bit in question is equal to one (472), then a memory barrier is executed (378). As a result, this per-processor need-memory-barrier bit is then incremented (474), so that it now has a value of two, indicating that a memory barrier has been provided or supplied.

ADVANTAGES AND CONCLUSION

Embodiments of the invention provide for advantages over the prior art. By using the various counters and bits as have been described, memory barriers are employed infrequently during the read side of real-time RCU operations. When a read lock is released after a read operation has been performed, the per-task read-lock-nesting counter corresponding to the task performing this operation is decremented. Only if this counter is then equal to zero is the-per processor counter pointed to by the per-task flip-counter pointer decremented. Then, only where this other counter is (i.e., becomes) equal to zero, where a corresponding per-processor need-memory-barrier is equal to one, and where this other counter is within the last set of per-processor counters, is a memory barrier executed.

Therefore, memory barriers are not executed for all read operations, and rather are executed only for some read operations. As a result, real-time read-side RCU operations are performed significantly more quickly in relation to the invention than in the prior art. Furthermore, at least some embodiments of the invention take advantage of naturally occurring memory barriers, which are memory barriers performed in relation to other operations occurring within the computerized system in question. Therefore, the likelihood that a real-time read-side RCU operation needs to execute a memory barrier is even lower in such embodiments.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such, it is manifestly intended that this invention be limited only by the claims and equivalents thereof.

We claim:

1. A method comprising:
   to update contents of a section of memory,
   copying a global flip-counter bit to a local flip-counter bit, the global flip-counter bit specifying which of a first set of per-processor counters and a second set of per-processor counters is a current set of per-processor counters and which is a last set of per-processor counters, the global flip-counter bit also specifying which of a first set of per-processor need-memory-barrier bits and a second set of per-processor need-memory-barrier bits is a current set of per-processor need-memory-barrier bits and which is a last set of per-processor need-memory-barrier bits;
   where attempting to acquire a flip-counter-bit lock on the global-flip-counter bit is successful,
       where the global flip-counter bit has not changed while acquiring the flip-counter-bit lock,
           where all of the last set of per-processor counters are zero, such that none of a plurality of threads being executed by a plurality of processors corresponding to the last set of per-processor counters are currently executing a critical read operation on the section of memory,
               where all of the last set of per-processor need-memory-barrier bits are zero, such that none of the processors needs to execute a memory barrier,
               setting each of the current set of per-processor need-memory-barrier bits to one, using the local flip-counter bit;
               inverting the global flip-counter bit; and,
               releasing the flip-counter-bit lock.

2. The method of claim 1, further comprising, executing a memory barrier before inverting the global flip-counter bit.

3. The method of claim 1, further comprising, to perform a critical read operation on the section of memory to read the contents of the section of memory, to acquire an effective read lock in performing the critical read operation,
   incrementing a per-task read-lock-nesting counter corresponding to a task performing the critical read operation;
   where the per-task read-lock-nesting counter is equal to one,
       copying the global flip-counter bit to the local flip-counter bit;
       incrementing the per-processor counter of the current set of per-processor counters that corresponds to a processor currently executing the task, using the local flip-counter bit; and,
       pointing a per-task flip-counter pointer corresponding to the task to the per-processor counter that was incremented.

4. The method of claim 3, wherein incrementing the per-processor counter of the current set of per-processor counters that corresponds to the processor currently executing the task comprises atomically incrementing the per-processor counter of the current set of per-processor counters that corresponds to the processor currently executing the task.

5. The method of claim 3, wherein incrementing per-processor counter of the current set of per-processor counters that corresponds to the processor currently executing the task comprises:
   where the per-processor counter corresponding to the processor currently executing the task is equal to zero, non-atomically incrementing the per-processor counter corresponding to the processor currently executing the task; and,
   where the per-processor counter corresponding to the processor currently executing the task is greater than zero, atomically incrementing the per-processor counter corresponding to the processor currently executing the task.

6. The method of claim 3, further comprising, reading the contents of the section of memory.

7. The method of claim 3, further comprising, to release the effective read lock in performing the critical read operation,
   decrementing the per-task read-lock-nesting counter corresponding to the task performing the critical read operation;
   where the per-task read-lock-nesting counter is equal to zero,
       decrementing the per-processor counter pointed to by the per-task flip-counter pointer;
       where the per-processor counter within the last set of per-processor counters for the processor currently executing the task is equal to zero, and a corresponding per-processor need-memory-barrier bit is not equal to zero,
           executing a memory barrier; and,
           clearing the corresponding per-processor need-memory-barrier bit.

8. The method of claim 7, wherein decrementing the per-processor counter pointed to by the per-task flip-counter pointer comprises atomically decrementing the per-processor counter pointed to by the per-task flip-counter pointer.

9. The method of claim 7, wherein decrementing the per-processor counter pointed to by the per-task flip-counter pointer comprises:
   where the per-processor counter pointed to by the per-task flip-counter pointer is equal to one, non-atomically decrementing the per-processor counter pointed to by the per-task flip-counter pointer; and, where the per-processor counter pointed to by the per-task flip-counter pointer is greater than one, atomically decrementing the per-processor counter pointed to by the per-task flip-counter pointer.

10. The method of claim 1, further comprising:
where a per-processor counter of the last set of per-processor counters corresponding to a given processor is equal to zero, and a per-processor need-memory-barrier bit of the last set of per-processor need-memory-barrier bits corresponding to the given processor is equal to one,
executing a memory barrier; and,
clearing the per-processor need-memory-barrier bit of the last set of per-processor need-memory-barrier bits corresponding to the given processor.

11. A method comprising:
to update contents of a section of memory,
copying a global flip-counter bit to a local flip-counter bit, the global flip-counter bit specifying which of a first set of per-processor counters and a second set of per-processor counters is a current set of per-processor counters and which is a last set of per-processor counters, the global flip-counter-bit also specifying which of a first set of per-processor need-memory-barrier bits and a second set of per-processor need-memory-barrier bits is a current set of per-processor need-memory-barrier bits and which is a last set of per-processor need-memory-barrier bits;
where attempting to acquire a flip-counter-bit lock on the global-flip-counter bit is successful,
where the global flip-counter bit has not changed while acquiring the flip-counter-bit lock,
where any of the last set of per-processor need-memory-barrier bits is equal to zero,
where a sum of all of the last set of per-processor counters is equal to zero,
incrementing each of the last set of per-processor need-memory-barrier bits, using the local flip-counter bit;
where all of the last set of per-processor need-memory-barrier bits are equal to two,
setting each of the current set of per-processor need-memory-barrier bits to zero, using the local flip-counter bit,
inverting the global flip-counter bit; and,
releasing the flip-counter-bit lock.

12. The method of claim 11, further comprising, executing a memory barrier before incrementing each of the last set of per-processor need-memory-barrier bits.

13. The method of claim 11, further comprising, executing a memory barrier before inverting the global flip-counter bit.

14. The method of claim 11, further comprising, to perform a critical read operation on the section of memory to read the contents of the section of memory, to acquire an effective read lock in performing the critical read operation,
incrementing a per-task read-lock-nesting counter corresponding to a task performing the critical read operation;
where the per-task read-lock-nesting counter is equal to one,
copying the global flip-counter bit to the local flip-counter bit;
incrementing the per-processor counter of the current set of per-processor counters that corresponds to a processor currently executing the task, using the local flip-counter bit; and,
setting a per-task flip-counter bit corresponding to the task equal to the local flip-counter bit.

15. The method of claim 14, further comprising:
prior to incrementing the per-task read-lock-nesting counter corresponding to the task performing the critical read operation, disabling preemption and/or interrupts; and,
after setting the per-task flip-counter bit corresponding to the task equal to the local flip-counter bit, enabling preemption and/or interrupts.

16. The method of claim 14, further comprising, to release the effective read lock in performing the critical read operation,
decrementing the per-task read-lock-nesting counter corresponding to the task performing the critical read operation;
where the per-task read-lock-nesting counter is equal to zero,
decrementing the per-processor counter within a set of per-processor counters specified by the per-task flip-counter bit and corresponding to the processor currently executing the task;
copying the global flip-counter bit to the local flip-counter bit;
where the per-processor need-memory-barrier bit within the last set of per-processor need-memory-barrier bits and corresponding to the processor currently executing the task is equal to one,
executing a memory barrier; and,
incrementing the per-processor need-memory-barrier bit within the last set of per-processor need-memory-barrier bits and corresponding to the processor currently executing the task.

17. The method of claim 16, further comprising:
prior to decrementing the per-task read-lock-nesting counter corresponding to the task performing the critical read operation, disabling preemption and/or interrupts; and,
after incrementing the per-processor need-memory-barrier bit within the last set of per-processor need-memory-barrier bits and corresponding to the processor currently executing the task, enabling preemption and/or interrupts.

18. The method of claim 11, further comprising:
where a per-processor need-memory-barrier bit of the last set of per-processor need-memory-barrier bits corresponding to a given processor is equal to one,
executing a memory barrier; and,
incrementing the per-processor need-memory-barrier bit of the last set of per-processor need-memory-barrier bits corresponding to the given processor.

* * * * *